(12) United States Patent
Jahnke, Jr. et al.

(10) Patent No.: US 6,474,934 B1
(45) Date of Patent: Nov. 5, 2002

(54) DIRECTED AIR FLOW COUPLING GUARD

(75) Inventors: William Henry Jahnke, Jr., Cuba, NY (US); John William Ash, Bradford, PA (US); Charles Alexander Greenawalt, Hinsdale, NY (US)

(73) Assignee: Dresser-Rand Company, Olean, NY (US)

(*) Notice: Subject to any disclaimer, the term of this patent is extended or adjusted under 35 U.S.C. 154(b) by 30 days.

(21) Appl. No.: 09/691,493

(22) Filed: Oct. 18, 2000

(51) Int. Cl.[7] .............................................. F04D 29/58
(52) U.S. Cl. ......................... 415/1; 415/180; 415/214.1
(58) Field of Search .......................... 415/1, 115, 116, 415/176, 180, 214.1; 416/95; 192/113.23, 18 A; 464/7, 17, 92, 170, 172

(56) References Cited

U.S. PATENT DOCUMENTS

| | | | |
|---|---|---|---|
| 2,129,468 A | * | 9/1938 | Heck ........................... 415/180 |
| 3,101,890 A | * | 8/1963 | Carson ........................ 415/180 |
| 3,407,629 A | | 10/1968 | Marchand |
| 3,678,708 A | * | 7/1972 | Ernst et al. .................... 464/17 |
| 3,705,502 A | | 12/1972 | Padgett |
| 3,768,276 A | | 10/1973 | Caldwell et al. |
| 3,805,553 A | * | 4/1974 | Yehl ............................. 464/172 |
| 4,173,120 A | * | 11/1979 | Grosjean et al. ............ 415/115 |
| 4,308,931 A | | 1/1982 | Khanna |
| 4,324,533 A | | 4/1982 | Schroeder et al. |
| 4,440,270 A | * | 4/1984 | Ross ..................... 188/264 AA |
| 4,696,660 A | | 9/1987 | Murphy et al. |
| 4,779,484 A | | 10/1988 | Poe |
| 4,804,211 A | | 2/1989 | Larson et al. |
| 4,848,409 A | | 7/1989 | Jahnke, Jr. |
| 5,051,071 A | | 9/1991 | Haentjens |
| 5,161,939 A | | 11/1992 | Stadler |
| 5,605,045 A | | 2/1997 | Halimi et al. ................ 415/177 |
| 5,711,710 A | | 1/1998 | Brisk |
| 5,890,880 A | * | 4/1999 | Lustwerk .................. 415/171.1 |

OTHER PUBLICATIONS

International Searching Authority, Patent Cooperation Treaty, Notification of Transmittal of The International Search Report or the Declaration, International Application No. PCT/US01,29403, Jan. 10, 2002, 7 pages.

* cited by examiner

Primary Examiner—John G. Weiss
Assistant Examiner—Richard Woo
(74) Attorney, Agent, or Firm—Haynes and Boone, LLP

(57) ABSTRACT

Method and apparatus are described for a guard for a rotating member. The guard comprises a shell surrounding the rotating member, and a plenum member concentrically spaced from an interior surface of the shell, the shell comprising an inlet for receiving air and an outlet for discharging the air so that rotation of the rotating member draws air through the inlet and into the plenum member and the air circulates through the plenum member to cool the shell before it exhausts through the outlet.

67 Claims, 8 Drawing Sheets

DIRECTED AIR FLOW COUPLING GUARD

This invention relates to a directed air flow coupling guard.

DETAILED DESCRIPTION

Figure 1:
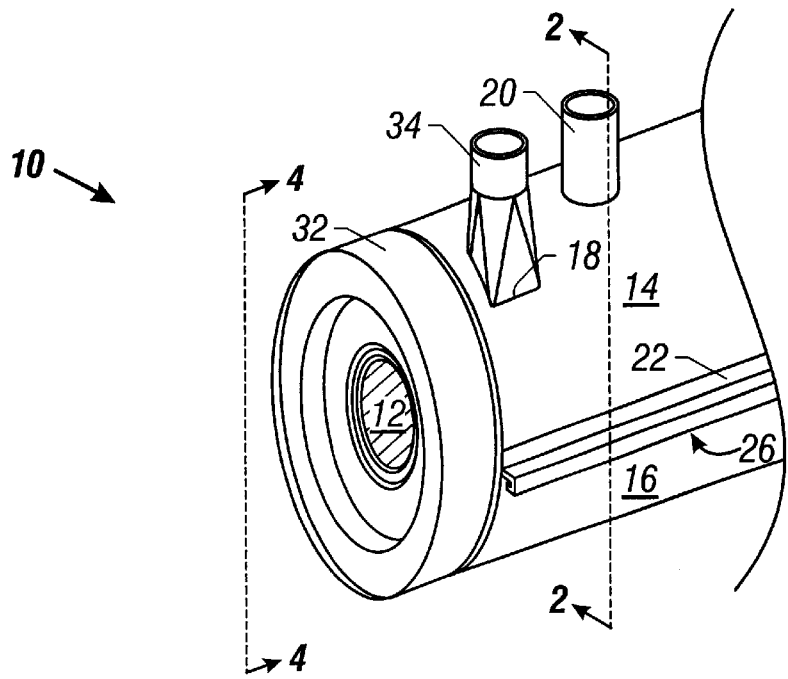
FIG. 1 is a perspective view of a coupling guard of the present embodiment.

Referring to FIG. 1, the reference numeral 10 refers to a coupling guard assembly that encloses a rotating coupling 12. It is understood that although a coupling is shown as an example, the guard could surround a shaft, a hub, or any rotating member. The guard assembly 10 has a pair of semi-cylindrical shell portions 14 and 16. The upper shell portion 14 has an opening 18, for reasons to be described, and an intake port 20 for allowing air flow into the guard 10.

Figure 2:
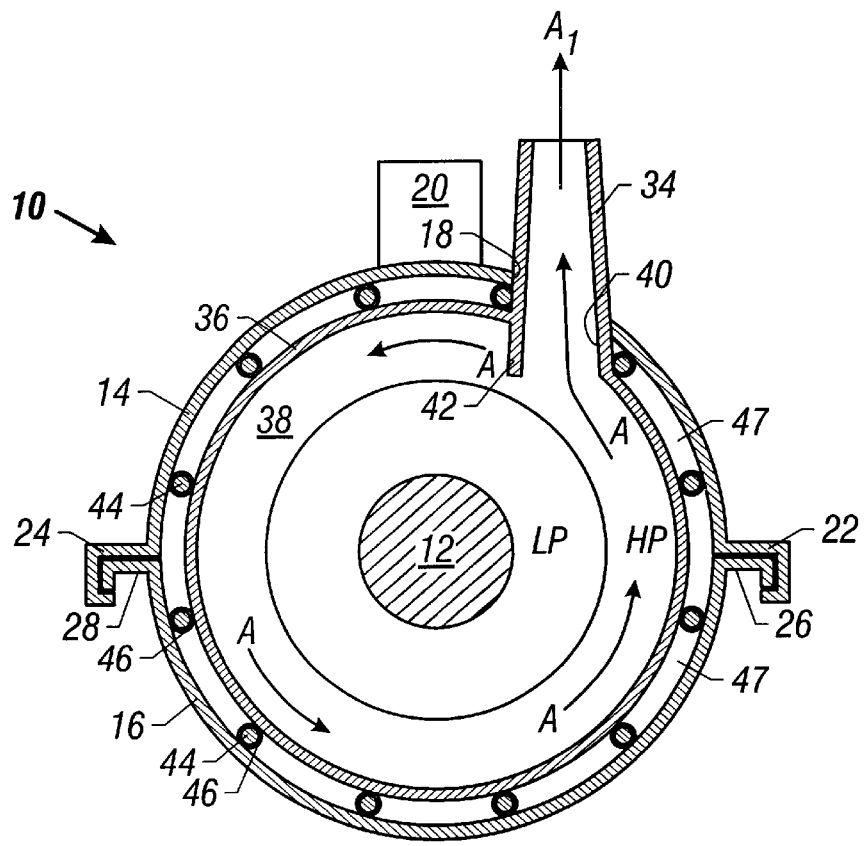
FIG. 2 is a cross sectional view of the coupling guard of FIG. 1 taken along the line 2—2 of FIG. 1.

As better shown in FIG. 2, a pair of J-shaped channels 22 and 24 are formed along the longitudinal edges of the upper shell portion 14. Correspondingly, the lower shell portion 16 has a pair of bent flanges 26 and 28 running lengthwise along the edges of the lower portion. The bent flanges 26 and 28 are received in the J-shaped channels 22 and 24 of the upper shell portion when the channels are flexed outwardly. As the J-shaped channels 22 and 24 return to the unflexed position, the bent flanges 26 and 28 are retained, and thus the channels and the flanges cooperate to form a snap-together connection. Thus connected, the upper and lower shell portions 14 and 16 define a substantially cylindrical enclosure, or shell, around the coupling 12. It is understood that gaskets (not depicted) may be used to seal adjoining portions of the shells 14 and 16.

Figure 3:
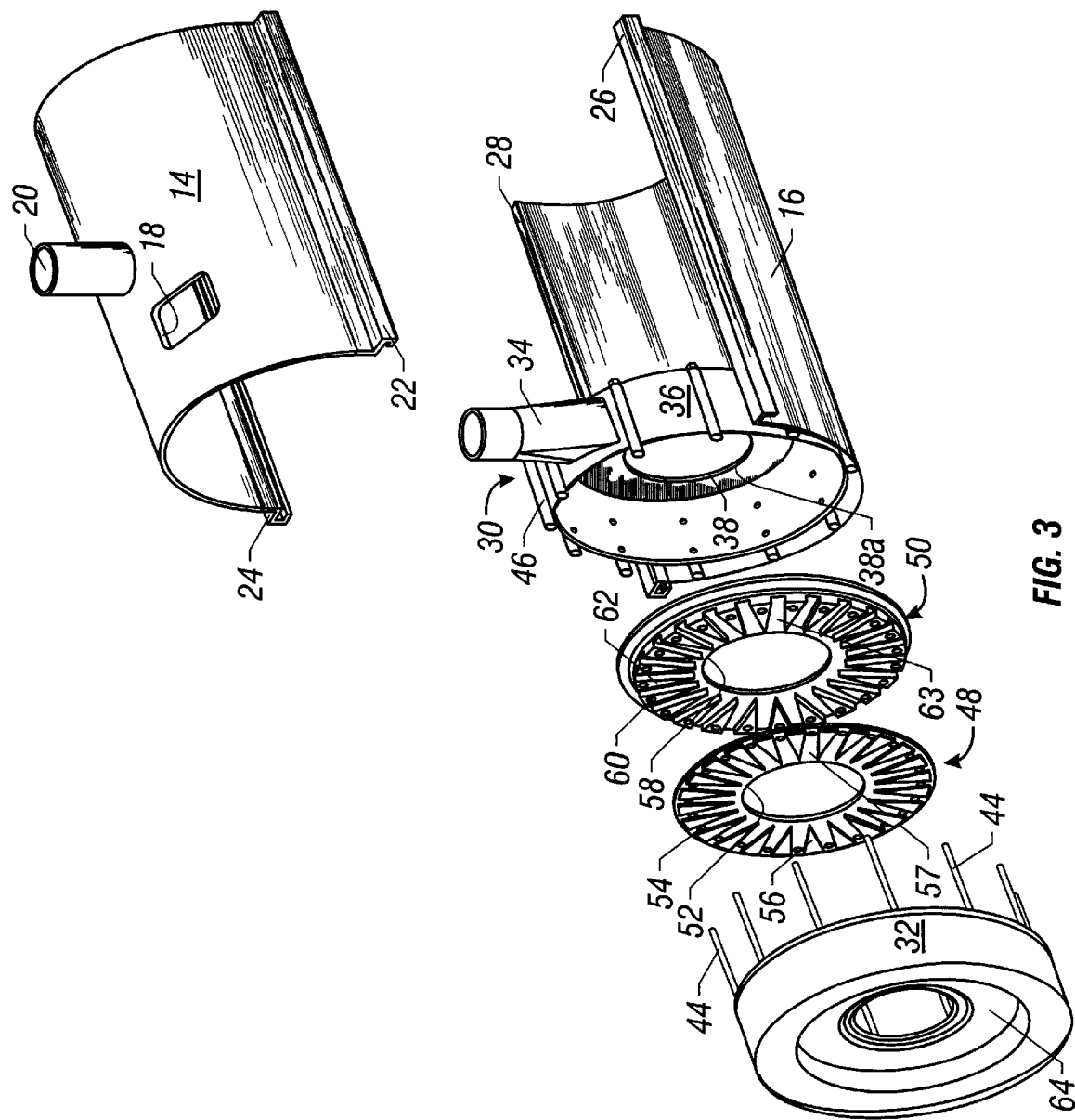
FIG. 3 is an exploded view of the coupling guard of FIG. 1 with the coupling removed.

Returning to FIG. 1, the upper and lower shell portions 14 and 16 overlap a plenum member 30 (FIG. 3). The plenum member 30 has a substantially cylindrical outer portion, and it is understood that gaskets may be used to seal the portion of the plenum member overlapped by the shells 14 and 16. An adapter 32 is disposed adjacent to the plenum member 30, and a vent pipe 34 extends from the plenum member 30 and protrudes outwardly through the opening 18 of the upper shell portion 14 to allow air flow from the interior of the guard 10 to the environment, as will be described.

Referring to FIGS. 2 and 3, the plenum member 30 has a ring 36, and the vent pipe 34 is attached to the ring. An orthogonal annular wall 38 extends from an inner surface of the ring 36 to partially define a plenum space around the coupling 12, as will be described. As shown in FIG. 3, the orthogonal annular wall 38 has an opening 38a for accommodating the coupling, which has been removed in FIG. 3 for simplicity of illustration.

As shown in FIG. 2, an opening 40 in the ring 36 allows the plenum space to be in communication with the vent pipe 34. A scraper plate 42 is disposed adjacent to the opening 40 for directing air currents, represented by arrows A, from the plenum space to the vent pipe 34.

A plurality of bolts 44 extend from the adapter 32, axially relative to the shell portions 14 and 16, for attaching the adapter to the ring 36 of the plenum member 30. The bolts 44 are received by a corresponding plurality of tubular receivers 46, disposed along the exterior surface of the ring 36, and held in place by any conventional means. The tubular receivers 46 cooperate with the exterior surface of the ring 36, and the shell portions 14 and 16, to define axial air passages 47 (FIG. 2) around the ring.

A pair of annular baffle plates 48 and 50 are captured between the adapter 32 and the ring 36, and are disposed transversely to the axis of the shell portions 14 and 16. The plate 48 has a large opening 52 to accommodate the coupling 12, as well as a plurality of angularly spaced openings 54, each of which is disposed adjacent a triangular baffle 56. A plurality of channels 57 are defined between the baffles 56.

The plate 50 cooperates with the ring 36 and the wall 38 to define the plenum space, and has a large opening 58 to accommodate the coupling 12, and a plurality of angularly spaced openings 60. Each opening 60 is disposed through a triangular baffle 62 and a plurality of channels 63 are defined between the baffles 62.

Figure 4:
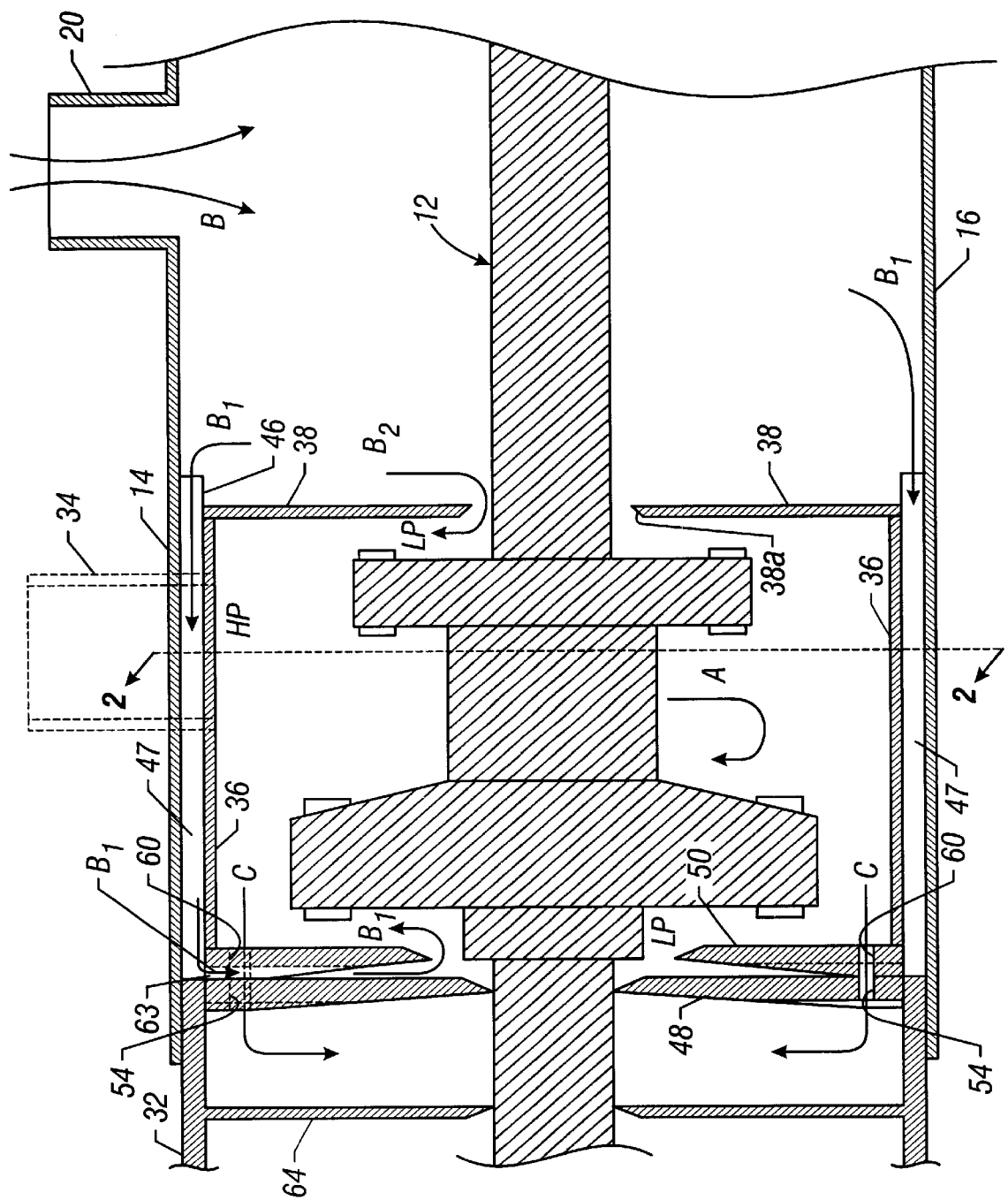
FIG. 4 is a longitudinal sectional view of the coupling guard of FIG. 1 taken along the line 4—4 of FIG. 1.

The coupling 12 is sealed by an annular labyrinth seal 64, a portion of which is illustrated in FIG. 4. The outer periphery of the seal 64 is attached to the inner surface of the adapter 32 in any known manner and the surface of the seal defining its central opening receives the coupling 12 and sealingly engages the outer surface of the coupling.

In operation, the coupling 12 is rotated by a power source (not shown), the rotation producing undesirable heat. Referring to FIGS. 2 and 4, protrusions of the rotating coupling 12, such as bolts, connectors, and other non-smooth features, act as impellers, creating the aforementioned air currents A (FIG. 2), which circulate equatorially inside the plenum space relative to the coupling. As better shown in FIG. 2, a portion of the air currents A, denoted $A_1$, are directed by the scraper plate 42 out the opening 40, and through the vent pipe 34, thus venting heat from the plenum space to cool the shell.

The rotating coupling 12 creates areas of relatively high pressure, denoted HP, at the radial extremities of the coupling. Areas of relatively low pressure, denoted LP, are created closer to the axis of the coupling 12. Fresh air, in the form of air currents, represented by arrows B (FIG. 4), is drawn into the guard 10 through the intake port 20 by the relatively low pressure LP surrounding the coupling 12.

A portion of the air currents B (FIG. 4), represented by arrows $B_1$ (FIG. 4), are drawn by low pressure through the air passages 47 defined between the ring 36, the tubular receivers 46, and either the upper or lower shell portions, 14 and 16, respectively. As shown in FIG. 4, the air currents $B_1$ are drawn into the channels 63 (FIG. 3) of the plate 50 by low pressure surrounding the coupling 12. The channels 63 allow the air currents $B_1$ to be directed toward the coupling, the air currents $B_1$ then are drawn into the plenum space to be exhausted. Thus, the constant unidirectional flow of air currents $B_1$ removes heat that would otherwise be building up in the space between the ring 36 and the upper and lower shell portions, 14 and 16, thus lessening heat transferred to the upper and lower shell portions.

Referring back to the fresh air currents B (FIG. 4), another portion of the fresh air currents B, represented by arrows $B_2$, is drawn by low pressure through the opening 38a of the wall 38 into the plenum space defined by the wall 38, the ring 36, and plate 50. These air currents $B_2$ replenish the air in the plenum space, a portion of which, as noted above, is exhausted as the air currents $A_1$ (FIG. 2) through the vent pipe 34 (shown in phantom in FIG. 4 for convenience of reference).

As the equatorial air currents A (FIG. 2), replenished by air currents $B_1$ and $B_2$, pass by the coupling 12, they receive heat, which is exhausted with the air currents $A_1$ (FIG. 2), thus lessening heat transferred to the upper and lower shell portions, 14 and 16. The exhaust of the air currents $A_1$ is assisted by the relatively high pressure HP experienced along the interior surface of the ring 36.

Moreover, the relatively high pressure HP experienced along the interior surface of the ring 36 also forces some air currents, represented by arrows C, out of the plenum space through the angularly spaced openings 60 of the plate 50 and the angularly spaced openings 54 of the plate 48. The air currents C enter a space between the plate 48 and the labyrinth seal 64 to decrease the low pressure area LP around ("buffer") the coupling 12, which greatly increases the efficiency of the labyrinth seal. Increasing the efficiency of the labyrinth seal 64 reduces the chance of smoke-producing oil entering the guard 10.

It is understood that a second plenum system, substantially identical to that described above, may be disposed around the coupling on the other side of the intake port 20 (to the left in FIG. 4).

Figure 5:
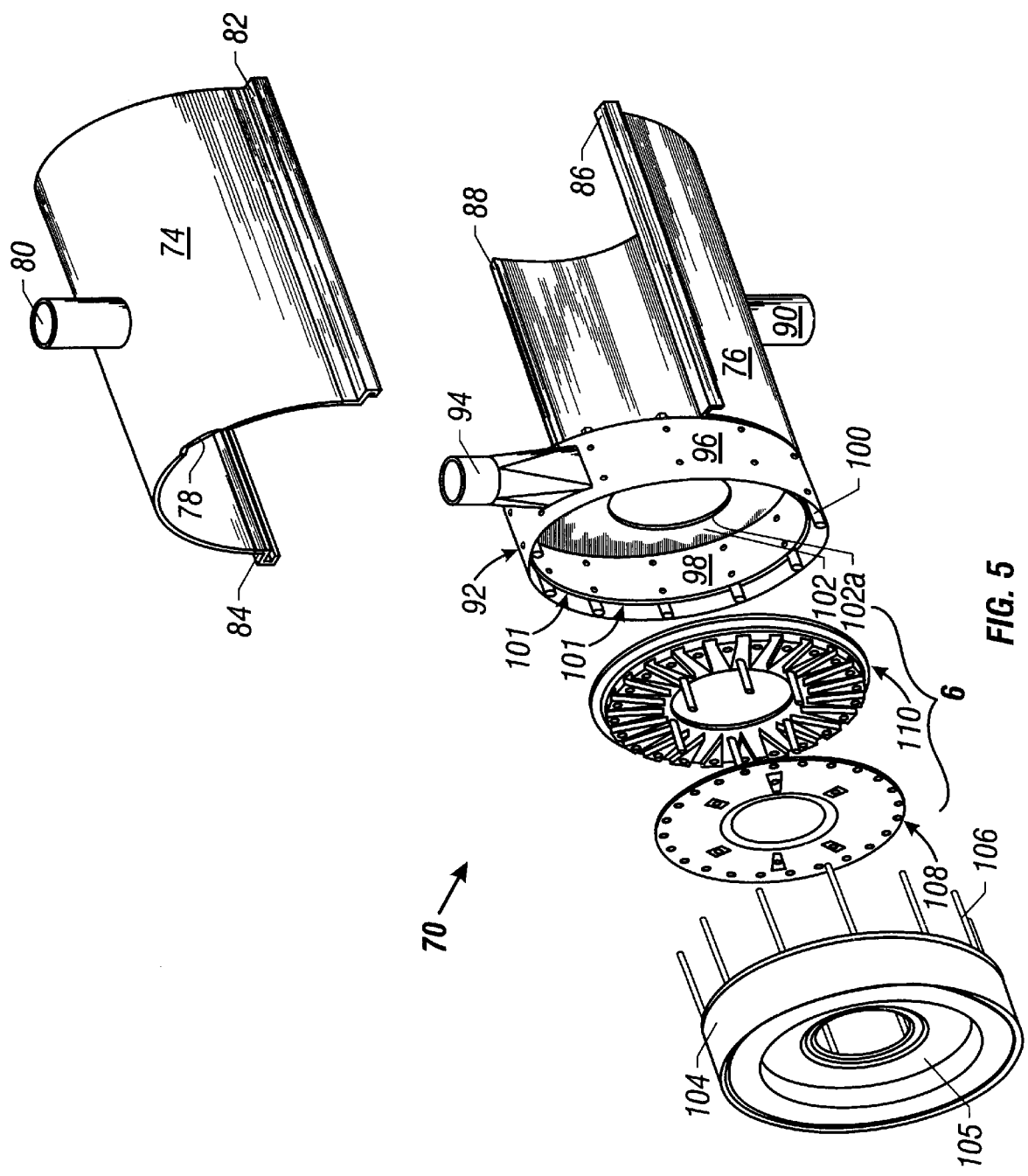
FIG. 5 is an exploded view of a coupling guard of an alternative embodiment.
Figure 6:
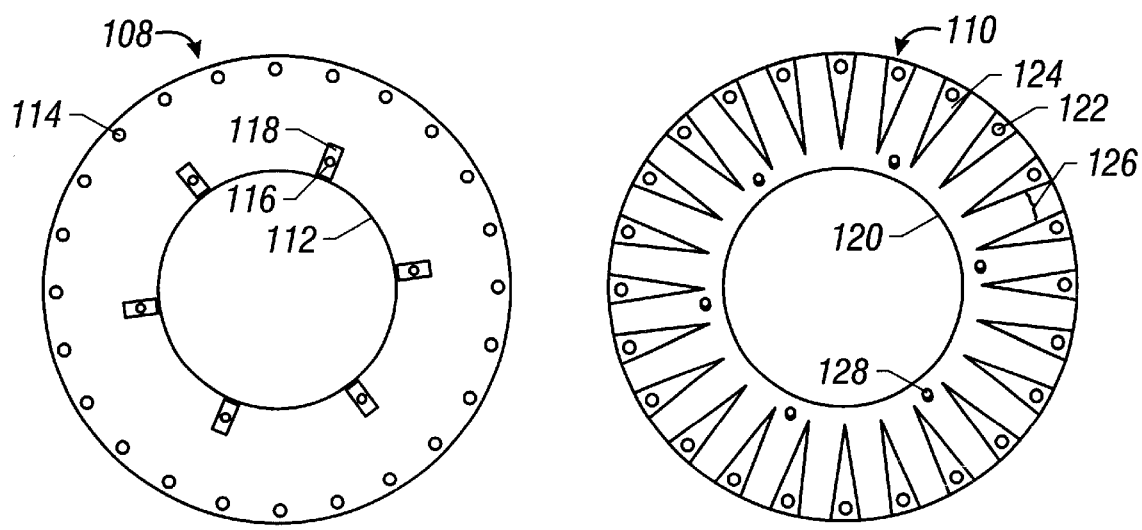
FIG. 6 is a plan view of a pair of baffle plates according to the alternative embodiment of FIG. 5.

Referring to FIGS. 5 and 6, the reference numeral 70 refers to an alternative embodiment of a coupling guard assembly for enclosing a rotating coupling (not depicted). The guard assembly 70 comprises a pair of semicylindrical shell portions 74 and 76. The upper shell portion 74 has a cutaway 78, and an intake port 80 for intake of air.

A pair of J-shaped channels 82 and 84 are formed along the longitudinal edges of the upper shell portion 74. Correspondingly, the lower shell portion 76 has a pair of bent flanges 86 and 88 running lengthwise along the edges of the lower portion. The bent flanges 86 and 88 are received in the J-shaped channels 82 and 84 of the upper shell portion when the channels are flexed relatively outward. As the J-shaped channels 82 and 84 return to an unflexed position, the bent flanges 86 and 88 are retained, and thus the channels and the flanges cooperate to form a snap-together connection. Thus connected, the upper and lower shell portions 74 and 76 define a substantially cylindrical shell around the coupling. It is understood that gaskets (not depicted) may be used to seal adjoining portions of the shells 74 and 76. The lower shell portion 76 also has an oil drain pipe 90, for removal of any fluid accumulating in the guard 70.

The upper and lower shell portions 74 and 76 are connected to a plenum member 92. The plenum member 92 comprises a vent pipe 94 which is accommodated by the cutaway 78 of the shell portion 74. The vent pipe 94 protrudes radially outwardly from a ring 96. A second ring 98 is disposed radially inwardly and concentric to the ring 96. The rings 96 and 98 are connected, and spaced apart, by a plurality of tubular receivers 100 to form air passages 101.

The interior surface of the ring 98 and an orthogonal wall 102 cooperate to define a plenum space around the coupling, the wall having an opening 102a. An opening (not depicted) in the rings 98 and 96 allows the plenum space to be in fluid communication with the vent pipe 94. Means for directing air currents from the plenum space to the vent pipe 94, for example, such as the scraper plate 42 (FIG. 2) of the previous embodiment, are disposed adjacent to the opening.

An adapter 104 is disposed adjacent to the rings 96 and 98, and houses a conventional labyrinth seal 105, a portion of which is illustrated in FIG. 5. A plurality of bolts 106 extend axially, relative to the shell portions 74 and 76, from the adapter 104. The bolts 106 are received by the tubular receivers 100 disposed along the exterior surface of the ring 96, and are secured by any conventional means, thus attaching the adapter 104 to the plenum member 92.

A pair of annular baffle plates 108 and 110 are disposed transverse to the axis of the shell portions 74 and 76, and are retained between the adapter 104 and the plenum member 92. As better shown in FIG. 6, the plate 108 has a large opening 112 to accommodate the coupling, and a plurality of angularly spaced openings 114, for reasons to be described. The plate 108 also has a plurality of reinforced openings 116, the openings each having a reinforcing member 118 for providing additional thickness to the plate 108.

The plate 110 has a large opening 120 to accommodate the coupling, and a plurality of angularly spaced openings 122, for reasons to be described. Each opening 122 is disposed on a triangular baffle 124. Adjacent baffles 124 cooperate with the plate 110 to define a channel 126. A set of pins 128 are disposed on the plate 110 in positions corresponding to the positions of the reinforced openings 116 of the plate 108. During assembly of the guard, the pins 128 are inserted into the reinforced openings 116, thus aligning the angularly spaced openings 114 of plate 108 with the angularly spaced openings 122 of plate 110, creating a plurality of air passages through the plates 108 and 110.

In operation, the assembled embodiment of FIGS. 5 and 6 operates substantially similar to the previously described embodiment of FIGS. 1–4. Protrusions of the rotating coupling (not depicted) act as impellers, creating areas of relatively high pressure at the radial extremities of the coupling, and areas of relatively low pressure closer to the axis of the coupling. The rotating coupling further produces air currents which circulate equatorially inside the plenum space defined by the plate 110, the ring 98, and the wall 102. As the air currents pass by the coupling they receive heat, and a portion of these air currents are exhausted through the vent pipe 94, thereby reducing the amount of heat that would otherwise be built up and transferred to the shell (portions 74 and 76). The relatively high pressure experienced at the radial extremities of the coupling encourages this exhausting of the air currents through the vent pipe 94.

Fresh air is drawn into the guard 70 through the intake port 80 by the low pressure surrounding the coupling. A portion of the fresh air is drawn axially by low pressure through the air passages 101, decreasing heat transfer from the ring 98 to the ring 96. These air currents are then drawn into the plenum space to replenish the air currents exhausted through the vent pipe 94. Another portion of the fresh air is drawn by low pressure around the coupling through the opening 102a of the wall 102 into the plenum space to replenish the air currents exhausted through the vent pipe 94. The relatively high pressure HP experienced along the radial extremities of the coupling forces some air currents out of the plenum space through the angularly spaced openings 122 and 114 of the plates to buffer the labyrinth seal 105. It is understood that exhausted air may be directed to the drain 90 for the purpose of blowing out the drain.

Figure 7:
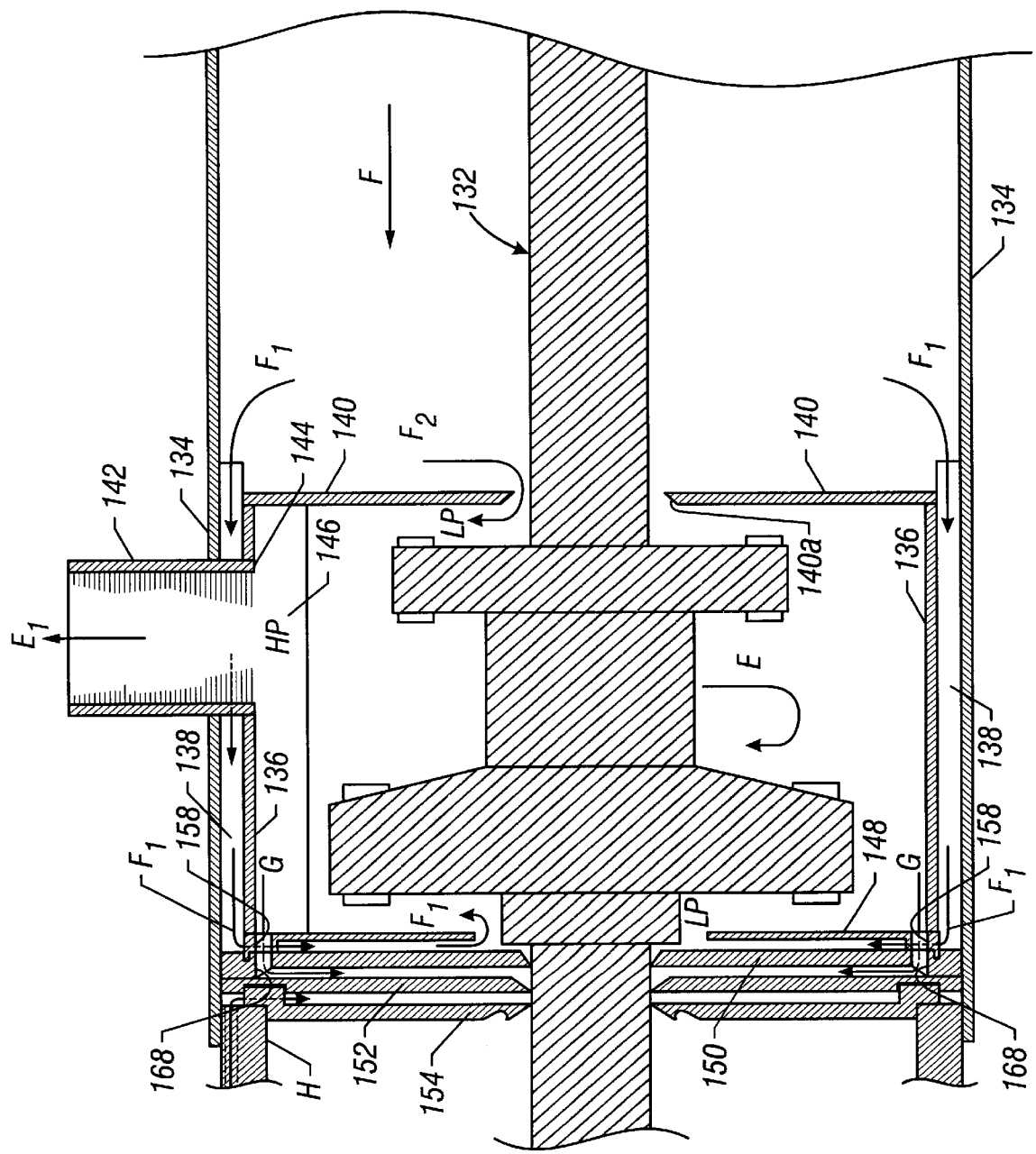
FIG. 7 is a longitudinal sectional view of a coupling guard of an alternative embodiment.

Referring to FIG. 7, the reference numeral 130 refers to yet another embodiment of a coupling guard assembly for enclosing a rotating coupling 132. It is understood that although a coupling is shown as an example, the guard could surround a shaft, a hub, or any rotating member. The guard assembly 130 has a substantially cylindrical shell 134 surrounding the coupling 132, and having an opening (not depicted) for allowing air flow into the guard 130. The shell 134 receives an inner ring 136, spaced from the shell to define an axial air passage 138 around the ring.

An orthogonal annular wall 140 extends from an inner surface of the ring 136 to partially define a plenum space around the coupling 132, as will be described. The orthogonal annular wall 140 has an opening 140a for accommodating the coupling 132.

A vent pipe 142 extends from the ring 136 and protrudes outwardly through the shell 134 to allow air flow from the plenum space to the environment, as will be described. An opening 144 in the ring 136 allows the plenum space to be in communication with the vent pipe 142. A scraper plate 146 is disposed adjacent to the opening 144 for directing air currents from the plenum space to the vent pipe 142, as will be described.

Four annular baffle plates, 148–154 are disposed adjacent to the ring 136, transversely to the axis of the shell 134. The plate 148 further defines the plenum space around the coupling 132, while plates 150–154 cooperate for directing air to the coupling and sealingly engaging the outer surface of the coupling.

Figure 8A:
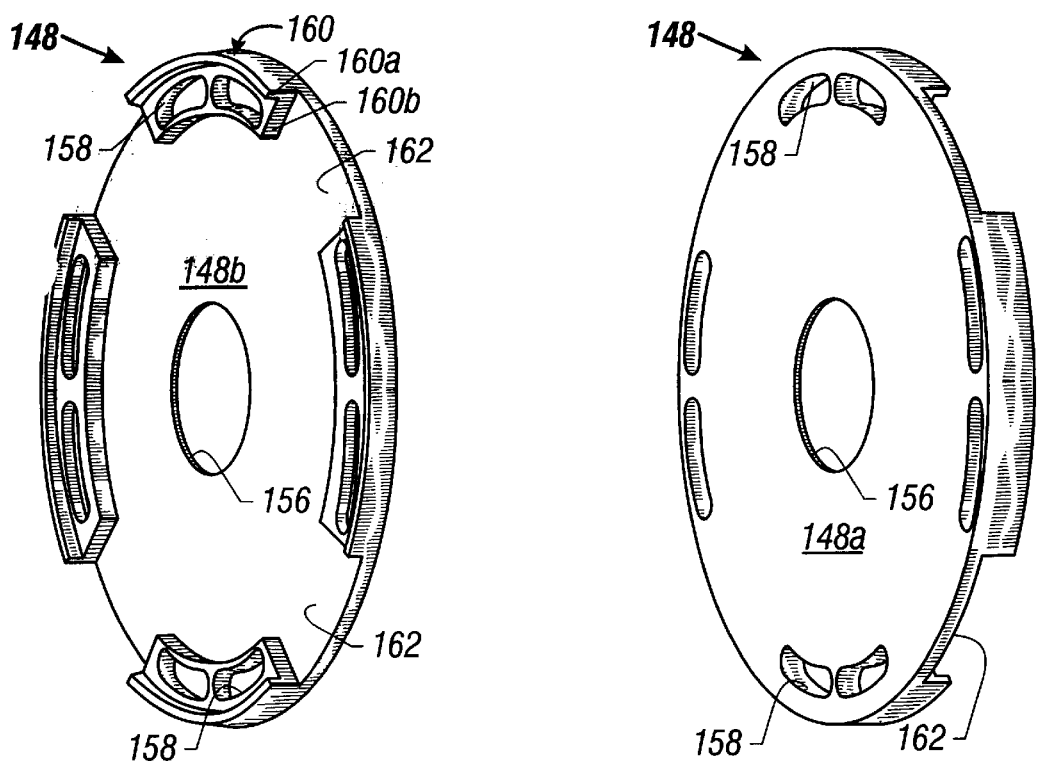
FIGS. 8a–d are perspective views of baffle plates, showing the front and back surfaces, according to the alternative embodiment of FIG. 7.

Referring now to FIG. 8a, the plate 148 is has a first side 148a (illustrated to the right) which helps define the plenum space (FIG. 7), and a second side 148b (illustrated to the left). The plate 148 has a large opening 156 to accommodate the coupling 132, and a plurality of angularly spaced openings 158. The side 148b of the plate has projections 160, surrounding the angularly spaced openings 158, each projection comprising a lip portion 160a, and a base portion 160b. A plurality of channels 162 are defined between the projections 160.

Figure 8B:
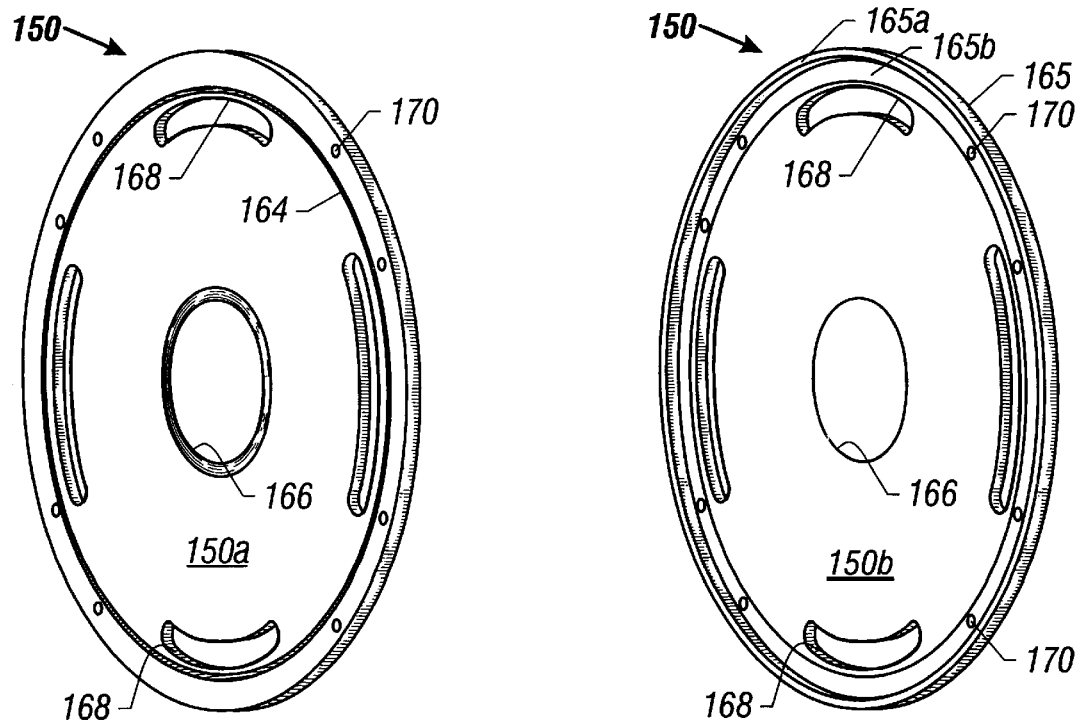

Referring now to FIG. 8b, the plate 150 has a first side 150a (illustrated to the left) which is disposed adjacent to side 148b (FIG. 8a) of plate 148 in FIG. 7. A groove 164 of side 150a receives the lip 160a (FIG. 8a) of plate 148. The plate 150 has a second side 150b (illustrated to the right), which has a projection 165 surrounding the radial extremity of the plate, each projection comprising a lip portion 165a, and a base portion 165b. The plate 150 has a large tapered opening 166 to accommodate the coupling 132, and a plurality of angularly spaced openings 168, which cooperate to define an air passage with the angularly spaced openings 158 of the plate 148. A plurality of bolt holes 170 are disposed in the plate 150.

Figure 8C:
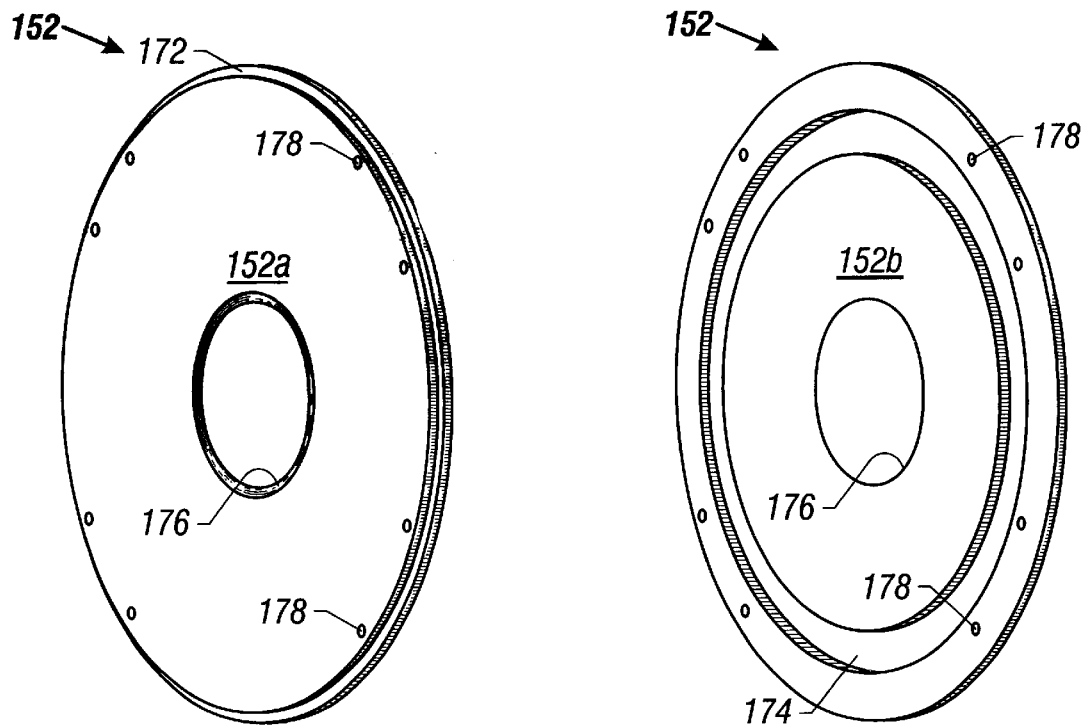

Referring now to FIG. 8c, the plate 152 has a first side 152a (illustrated to the left) which is disposed adjacent to side 150b (FIG. 8b) of plate 150 in FIG. 7. A groove 172 of side 152a receives the lip 165a (FIG. 8b) of plate 150. The plate 152 has a second side 152b (illustrated to the right), which has a large groove 174. The plate 150 has a large tapered opening 176 to accommodate the coupling 132. A plurality of bolt holes 178 are disposed in the plate 152 for aligning with the bolt holes 170 (FIG. 8b) of the plate 150.

Figure 8D:
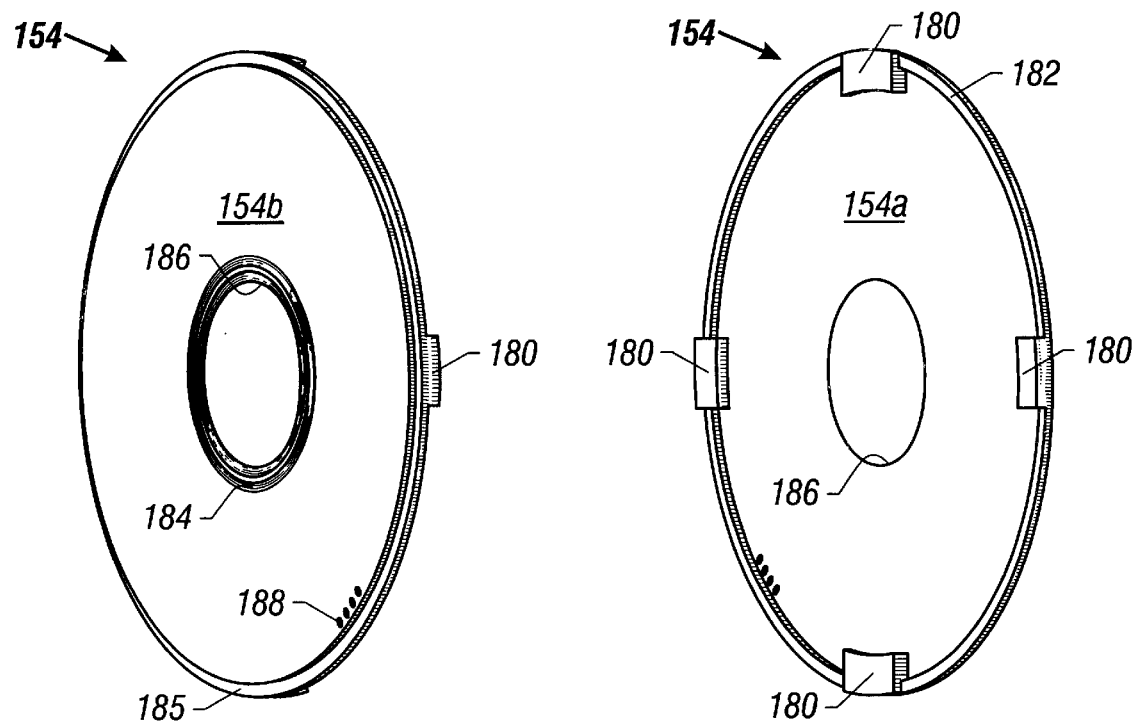

Referring now to FIG. 8d, the plate 154 has a first side 154a (illustrated to the right) which is disposed adjacent to side 152b (FIG. 8c) of plate 152 in FIG. 7. A plurality of projections 180 of side 152a engage the large groove 174 (FIG. 8c) of plate 152 in FIG. 7. The plate 154 has a rim 182 surrounding the radial extremity of the plate. The plate 154b has a second side 154b (illustrated to the left), which has a notch 184 for trapping oil, as well as a groove 185 disposed around the radial extremity of the plate. The plate 154 has a large tapered opening 186 to accommodate the coupling 132, and a plurality of drain holes 188 for allowing lubricating oil to escape from between the plates 152 and 154.

In operation, and referring to FIGS. 7 and 8a–d, the coupling 132 is rotated by a power source (not shown), the rotation producing undesirable heat. Protrusions of the rotating coupling 132, such as bolts, connectors, and other non-smooth features, act as impellers, creating air currents, represented by arrows E, which circulate equatorially inside the plenum space relative to the coupling. A portion of the air currents E, denoted $E_1$, are directed by the scraper plate 146 out the opening 144, and through the vent pipe 142, thus venting heat from the plenum space to cool the shell.

The rotating coupling 132 creates areas of relatively high pressure, denoted HP, at the radial extremities of the coupling. Areas of relatively low pressure, denoted LP, are created closer to the axis of the coupling 132. Fresh air, represented by arrows F, is drawn by the relatively low pressure LP surrounding the coupling 132 into the guard 130 through an opening (not depicted). A portion of the air currents F, represented by arrows $F_1$, are drawn by low pressure through the air passages 138 defined between the ring 136 and the shell 134. As shown in FIG. 7, the air currents $F_1$ are then drawn into the channels 162 (FIG. 8a) of the plate 148 by the low pressure surrounding the coupling 132. The channels 162 allow the air currents $F_1$ to pass between the plates 148 and 150, and be directed toward the coupling, thereafter returning to the plenum space to be exhausted. Thus, the constant unidirectional flow of air currents $F_1$ removes heat that would otherwise be building up in the space between the ring 136 and the shell 134, thus lessening heat transferred to the shell.

Referring back to the fresh air currents F, another portion of the fresh air currents F, represented by arrows $F_2$, is drawn by low pressure through the opening 140a of the wall 140 into the plenum space defined by the wall 140, the ring 136, and plate 148. These air currents $F_2$ replenish the air in the plenum space, a portion of which, as noted above, is exhausted as the air currents $E_1$ through the vent pipe 142. As the equatorial air currents E, replenished by air currents $F_1$ and $F_2$, pass by the coupling 132, they receive heat, which is exhausted with the air currents $E_1$, thus lessening heat transferred to the shell 134. The exhaust of the air currents $E_1$ is assisted by the relatively high pressure HP experienced along the interior surface of the ring 136.

Moreover, the relatively high pressure HP experienced along the interior surface of the ring 136 also forces some air currents, represented by arrows G, out of the plenum space through the angularly spaced openings 158 of the plate 148 and the angularly spaced openings 168 of the plate 150. The air currents G enter a space between the plate 150 and the plate 152 to decrease the low pressure area LP around the coupling 132, which greatly increases the efficiency of the seal formed by the plates 152 and 154. Increasing the efficiency of the aforementioned seal reduces the chance of smoke-producing oil entering the guard 130.

Another set of air currents, represented by arrows H, may be introduced between the plates 154 and 152 to further increase the efficiency of the aforementioned seal. It is understood that the air currents H may be used to blow out lubricating oil that may collect between the plates 152 and 154 through the drain holes 188 (FIG. 8d) of the plate 154.

It is understood that a second plenum system, substantially identical to that described above, may be disposed around the coupling.

Furthermore, it is understood that all spatial references, such as inner, outer, left, and right, are only for the purposes of explanation of the drawings. This disclosure shows and describes illustrative embodiments, however, the disclosure contemplates a wide range of modifications, changes, and substitutions. Such variations may employ only some features of the embodiments without departing from the scope of the underlying invention. Accordingly, any appropriate construction of the appended claims will reflect the broad scope of the underlying invention.

What is claimed is:

1. A coupling guard for a rotating member having a labyrinth seal, the coupling guard comprising:
   a shell surrounding the rotating member; and
   means for defining a plenum disposed in the shell, the shell comprising an inlet for receiving air and an outlet for discharging the air so that rotation of the rotating member draws air through the inlet and into the plenum and the air circulates through the plenum to cool the shell before it exhausts through the outlet;
   wherein at least a portion of the air in the plenum is directed to the seal for buffering the labyrinth seal.

2. The guard of claim 1 wherein a portion of the air circulates equatorially inside the plenum.

3. The guard of claim 1 wherein a portion of the air passes axially around the means for defining a plenum.

4. The guard of claim 1 wherein a scraper plate directs the air from the plenum to the outlet.

5. The guard of claim 1 wherein rotation of the rotating member causes areas of high pressure and low pressure, the low pressure drawing air in the inlet and the high pressure directing the air from the plenum to the outlet.

6. The guard of claim 1 wherein the means for defining a plenum comprises a ring concentrically spaced from an interior surface of the shell.

7. The guard of claim 1 wherein the means for defining a plenum comprise:
   (i) an orthogonal wall;
   (ii) a ring concentrically spaced from an interior surface of the shell, and attached to the orthogonal wall along a first edge; and
   (iii) at least one plate abutting a second edge of the ring.

8. The guard of claim 7 further comprising a second plate.

9. The guard of claim 8 wherein the plates have aligned openings for receiving at least a portion of the air and directing it through the plates.

10. The guard of claim 8 wherein the plates have projections to define radial air passages between the plates for receiving at least a portion of the air and directing it toward the rotating member.

11. The guard of claim 1 wherein the shell comprises:
    a first shell portion; and
    a second shell portion quick-detachably attached to the first shell portion.

12. The guard of claim 1 wherein the shell has a drain for fluid removal.

13. A coupling guard for a rotating member having a labyrinth seal, the coupling guard comprising:
    a shell surrounding the rotating member; and
    a plenum member concentrically spaced from an interior surface of the shell, the shell comprising an inlet for receiving air and an outlet for discharging the air so that rotation of the rotating member draws air through the inlet and into the plenum member and the air circulates through the plenum member to cool the shell before it exhausts through the outlet;
    wherein at least a portion of the air in the plenum member is directed to the labyrinth seal for buffering the seal.

14. The guard of claim 13 wherein a portion of the air circulates equatorially inside the plenum member.

15. The guard of claim 13 wherein a portion the air passes axially between the plenum member and the shell.

16. The guard of claim 13 wherein the plenum member comprises:
    (i) an orthogonal wall;
    (ii) a ring attached to the orthogonal wall along a first edge; and
    (iii) at least one plate abutting a second edge of the ring.

17. The guard of claim 16 further comprising a second plate.

18. The guard of claim 17 wherein the plates have aligned openings for receiving at least a portion of the air and directing it through the plates.

19. The guard of claim 17 wherein the plates have projections to define radial air passages between the plates for receiving at least a portion of the air and directing it toward the rotating member.

20. The guard of claim 13 wherein the shell has a drain for fluid removal.

21. The guard of claim 13 wherein the shell comprises:
    a first shell portion; and
    a second shell portion quick-detachably attached to the first shell portion.

22. The guard of claim 21 wherein the first shell portion has a port for intaking flow.

23. The guard of claim 21 wherein the first shell portion has a port for exhausting air flow.

24. A guard for surrounding a rotating member having a seal, the guard comprising:
    a first shell portion;
    a second shell portion quick-detachably attached to the first shell portion;
    a plenum member disposed adjacent to the first and second shell portions, the plenum member comprising:
    (i) an orthogonal wall
    (ii) a ring attached to the orthogonal wall along a first edge; and
    (iii) at least one plate abutting a second edge of the ring, thus defining a plenum space; and
    means for receiving air and discharging air so that rotation of the rotating member draws air into the plenum member. and the air circulates around and through the plenum member to cool the shell before it exhausts through an opening in the plenum member, thereby cooling the shell portions;
    wherein at least a portion of the air in the plenum member is directed to the seal for buffering the seal.

25. The guard of claim 24 wherein the first shell portion has a port for intaking air flow.

26. The guard of claim 24 wherein the second shell portion has a drain for fluid removal.

27. The guard of claim 24 further comprising a second plate.

28. The guard of claim 27 wherein the plates have aligned openings for receiving at least a portion of the air and directing it through the plates.

29. The guard of claim 27 wherein the plates have projections to define radial air passages between the plates for receiving at least a portion of the air and directing it toward the rotating member.

30. A method for cooling a coupling guard having a shell, and surrounding a rotating member having a labyrinth seal, the method comprising:

providing a plenum member inside the shell to define a plenum space;

creating an axial air flow path around the outer surface of the plenum member;

creating an equatorial air flow path inside the plenum member;

exhausting the equatorial air flow from the plenum space, thereby cooling the rotating member and guard; and directing the axially flowing air to the seal for buffering the labyrinth seal.

31. The method of claim 30 wherein rotation of the rotating member provides the impetus for the air flow.

32. A plenum member for facilitating cooling of a shell surrounding a rotating member having a labyrinth seal, the plenum member comprising:
    (i) an orthogonal wall;
    (ii) a ring attached to the orthogonal wall along a first edge;
    (iii) at least one plate abutting a second edge of the ring;
    means for creating an axial air flow path around the outer surface of the plenum member;
    means for creating an equatorial air flow path inside the plenum member;
wherein rotation of the rotating member provides an impetus for exhausting air from inside the plenum member, thereby cooling the shell; and
    means for directing the axially flowing air to the seal for buffering the labyrinth seal.

33. The plenum member of claim 32 further comprising a second plate.

34. The plenum member of claim 33 wherein the plates have aligned openings for receiving at least a portion of the air and directing it through the plates.

35. The plenum member of claim 33 wherein the plates have projections to define radial air passages between the plates for receiving at least a portion of the air and directing it toward the rotating member.

36. A guard for a rotating member, the guard comprising:
    a shell surrounding the rotating member;
    a plenum disposed in the shell, the plenum comprising:
        (i) an orthogonal wall
        (ii) a ring concentrically spaced from an interior surface of the shell, and attached to the orthogonal wall along a first edge; and
        (iii) two plates abutting a second edge of the ring; and
    a third and fourth plate for sealingly engaging the rotating member;
wherein the shell comprises an inlet for receiving air and an outlet for discharging the air so that rotation of the rotating member draws air through the inlet and into the plenum and the air circulates through the plenum to cool the shell before it exhausts through the outlet.

37. The guard of claim 36 wherein a portion of the air circulates equatorially inside the plenum.

38. The guard of claim 36 wherein a portion of the air passes axially around the plenum.

39. The guard of claim 36 wherein a scraper plate directs the air from the plenum to the outlet.

40. The guard of claim 36 wherein rotation of the rotating member causes areas of high pressure and low pressure, the low pressure drawing air in the inlet and the high pressure directing the air from the plenum to the outlet.

41. The plenum member of claim 36 wherein the two plates abutting a second edge of the ring have aligned openings for receiving at least a portion of the air and directing it through the plates.

42. The plenum member of claim 36 wherein the two plates abutting a second edge of the ring have projections to define: radial air passages between the plates for receiving at least a portion of the air and directing it toward the rotating member.

43. The guard of claim 36 wherein the shell comprises:
    a first shell portion; and
    a second shell portion quick-detachably attached to the first shell portion.

44. The guard of claim 36 wherein the shell has a drain for fluid removal.

45. The guard of claim 36 further comprising means for introducing air currents between the third and fourth plates to increase the efficiency of the sealing engagement.

46. A guard for a rotating member, the guard comprising:
    a shell surrounding the rotating member;
    a plenum member concentrically spaced from an interior surface of the shell, the plenum comprising:
        (i) an orthogonal wall
        (ii) a ring concentrically spaced from an interior surface of the shell, and attached to the orthogonal wall along a first edge; and
        (iii) two plates abutting a second edge of the ring; and
    a third and fourth plate for sealingly engaging the rotating member;
wherein the shell comprises an inlet for receiving air and an outlet for discharging the air so that rotation of the rotating member draws air through the inlet and into the plenum and the air circulates through the plenum to cool the shell before it exhausts through the outlet.

47. The guard of claim 46 wherein a portion of the air circulates equatorially inside the plenum.

48. The guard of claim 46 wherein a portion of the air passes axially around the plenum.

49. The guard of claim 46 wherein a scraper plate directs the air from the plenum to the outlet.

50. The guard of claim 46 wherein rotation of the rotating member causes areas of high pressure and low pressure, the low pressure drawing air in the inlet and the high pressure directing the air from the plenum to the outlet.

51. The plenum member of claim 46 wherein the two plates abutting a second edge of the ring have aligned openings for receiving at least a portion of the air and directing it through the plates.

52. The plenum member of claim 46 wherein the two plates abutting a second edge of the ring have projections to define radial air passages between the plates for receiving at least a portion of the air and directing it toward the rotating member.

53. The guard of claim 46 wherein the shell comprises:
    a first shell portion; and
    a second shell portion quick-detachably attached to the first shell portion.

54. The guard of claim 46 wherein the shell has a drain for fluid removal.

55. The guard of claim 46 further comprising means for introducing air currents between the third and fourth plates to increase the efficiency of the sealing engagement.

56. A guard for surrounding a rotating member, the guard comprising
    a first shell portion;
    a second shell potion quick-detachably attached to the first shell portion;
    a plenum member disposed adjacent to the first and second shell portions, the plenum member comprising:

(i) an orthogonal wall
(ii) a ring attached to the orthogonal wall along a first edge; and
(iii) two plates abutting a second edge of the ring, thus defining a plenum space;
a third and fourth plate for sealingly engaging the rotating member; and
means for receiving air and discharging air so that rotation of the rotating member draws air into the plenum member and the air circulates around and through the plenum member to cool the shell before it exhausts through an opening in the plenum member, thereby cooling the shell portions.

57. The guard of claim 56 wherein a portion of the air circulates equatorially inside the plenum.

58. The guard of claim 56 wherein a portion of the air passes axially around the plenum.

59. The guard of claim 56 wherein a scraper plate directs the air from the plenum to the outlet.

60. The guard of claim 56 wherein rotation of the rotating member causes areas of high pressure and low pressure, the low pressure drawing air in the inlet and the high pressure directing the air from the plenum to the outlet.

61. The guard of claim 56 wherein the second shell portion has a drain for fluid removal.

62. The plenum member of claim 56 wherein the two plates abutting a second edge of the ring have aligned openings for receiving at least a portion of the air and directing it through the plates.

63. The plenum member of claim 56 wherein the two plates abutting a second edge of the ring have projections to define radial air passages between the plates for receiving at least a portion of the air and directing it toward the rotating member.

64. The guard of claim 56 further comprising means for introducing air currents between the third and fourth plates to increase the efficiency of the sealing engagement.

65. A plenum member for facilitating cooling of a shell surrounding a rotating member, the plenum member comprising:

an orthogonal wall;

a ring attached to the orthogonal wall along a first edge;

two plates abutting a second edge of the ring;

a third and fourth plate for sealingly engaging the rotating member;

means for creating an axial air flow path around the outer surface of the plenum member; and means for creating an equatorial air flow path inside the plenum member, wherein rotation of the rotating member provides an impetus for exhausting air from inside the plenum member, thereby cooling the shell.

66. The plenum member of claim 65 wherein the two plates abutting a second edge of the ring have aligned openings for receiving at least a portion of the air and directing it through the plates.

67. The plenum member of claim 65 wherein the two plates abutting a second edge of the ring have projections to define radial air passages between the plates for receiving at least a portion of the air and directing it toward the rotating member.

* * * * *